July 2, 1968 R. R. BUMBAUGH 3,390,924
GROUSER SHOE
Filed Aug. 29, 1966
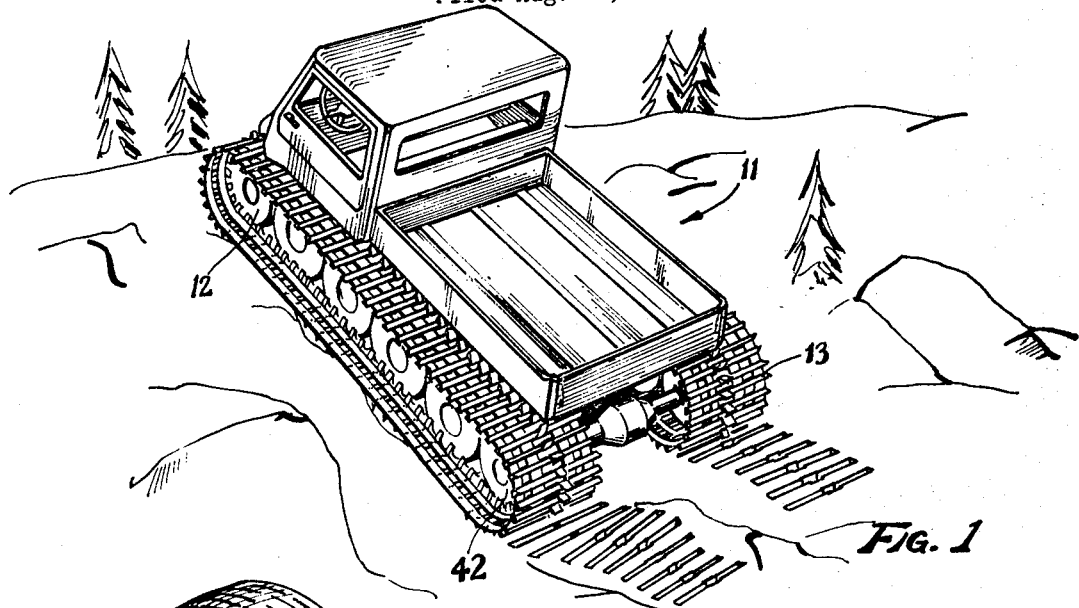
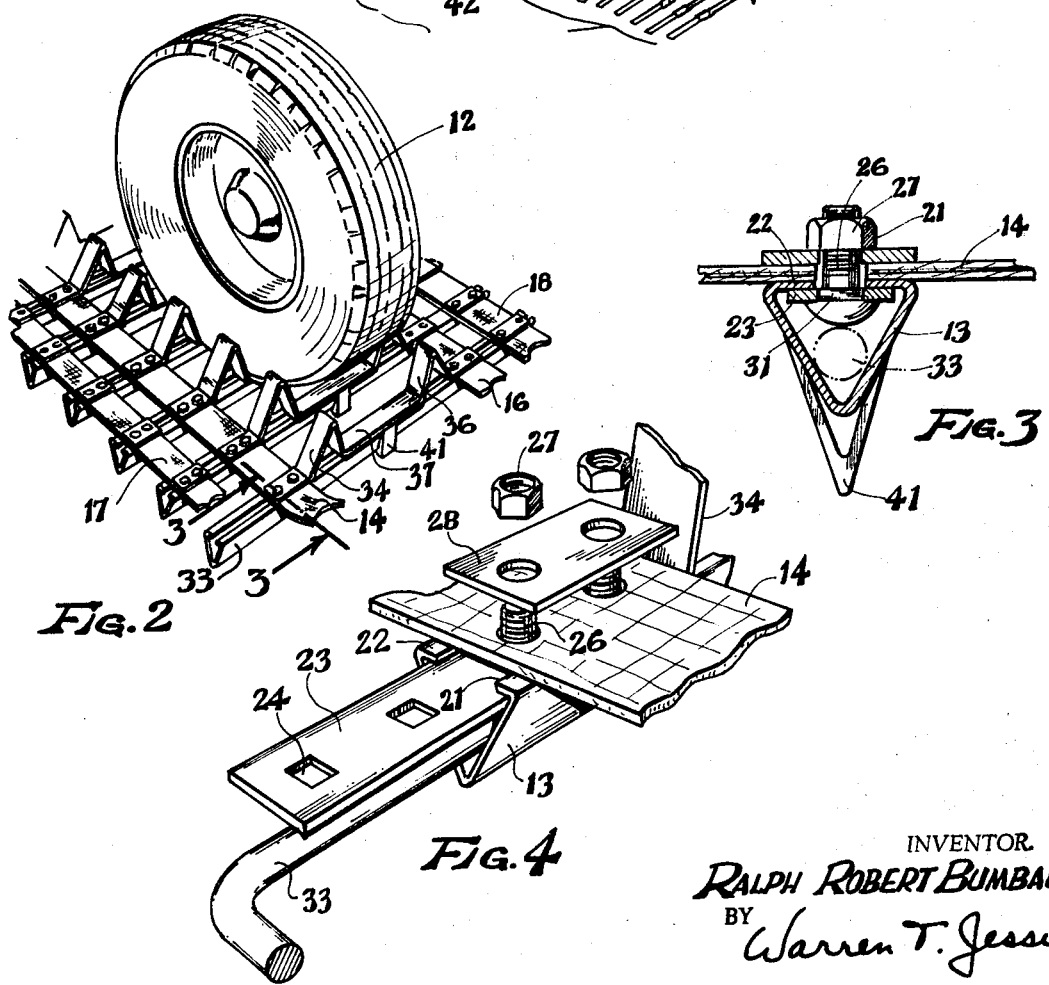
INVENTOR.
RALPH ROBERT BUMBAUGH
BY Warren T. Jessup
ATTORNEY United States Patent Office 3,390,924
Patented July 2, 1968

3,390,924
GROUSER SHOE
Ralph Robert Bumbaugh, Mammoth Lakes, Calif., assignor to Mammoth Mountain Chair Lift No. 1, Mammoth Lakes, Calif., a corporation of California
Filed Aug. 29, 1966, Ser. No. 575,724
1 Claim. (Cl. 305—35)

ABSTRACT OF THE DISCLOSURE

A snow vehicle has a plurality of aligned wheels encircled by flexible endless belts at each side of the line of wheels. Grouser bars are secured laterally to the belt to provide traction. The bars have bales which embrace the wheels and provide guidance. A damaged bar may be readily removed and replaced by virtue of the bar structure, which consists of a slot along the top of the bar through which securing bolts pass inwardly through holes in the belts.

---

This invention relates to endless track vehicles, and particularly to a grouser shoe or cleat attached to the endless track or belt which propels the vehicle.

Endless track vehicles are widely used in heavy snow because of the broad load distribution which supports them on the surface of the snow, and because of the excellent traction provided by the endless track or belt. A widespread use of such vehicles is in snow resort areas, where the problem is not only to move across the surface of the snow, transporting personnel and material, but to do so without measurably scarifying the snow surface, which would render it unsuitable for later snow sports, such as skiing. Such vehicles are usually subjected to constant and intense wear and to rugged use, which requires frequent replacement of the parts subjected to the most intense wear. One of such parts is the grouser shoes or treads which actually contact and dig into the snow in order to provide the necessary traction.

The problem solved by the present invention, not satisfactorily met by prior devices, is the provision of a grouser shoe or tread which will not only subject the snow to only a minimum of scarifying action, but also which may be readily removed and replaced as the old shoes wear out or are damaged.

In accordance with the present invention, a grouser shoe or bar is provided which is tubular and substantially triangular in cross section, with an apex of the triangle being directed outwardly, away from the endless belt to which it is mounted. The grouser shoe is also constructed so that it may be very easily removed and replaced; thereby minimizing the down time for the snow vehicle, a critical factor in most resort areas where intense use is necessary often around the clock. In accordance with the present invention, the grouser shoe is provided with a continuous slot along the top through which mounting bolts may pass into the endless driving belt. A backing bar is interposed to close the slot and thereby provide a base for the mounting bolts.

A preferred form of the present invention will now be described with reference to the accompanying drawing wherein:

FIGURE 1 is a perspective view of a snow vehicle having the grouser shoe of the present invention.

FIGURE 2 is a fragmentary perspective view, showing the manner in which the wheels of the vehicle rest on the grouser shoes and to some extent the manner in which the shoes are attached to the endless flexible driving belts.

FIGURE 3 is a fragmentary cross section taken on line 3—3 of FIGURE 2.

FIGURE 4 is a fragmentary perspective view showing the manner in which the grouser shoes are easily detached from and attached to the driving belt.

Referring to FIGURE 1, there is illustrated a snow vehicle 11 having, at each side, rows of longitudinally aligned wheels. Wheels 12 on the left side of the vehicle 11 are shown. Corresponding wheels, not seen in the view, are also provided on the right-hand side of the vehicle 11.

The wheels 12 ride on an endless track provided by a plurality of lateral or transverse grouser shoes 13, which are mounted to longitudinally oriented endless flexible belts. An inner pair of belts 14 and 16 are disposed, one on each side of the wheels 12. Outwardly of the belts 14–16 are a pair of similar, outer belts 17–18.

The grouser shoes 13 are secured transversely to the belts 14–18, adjacent the outer surface of the belts. That is, when the grouser shoes 13 are in contact with the ground or the snow, they are beneath the belts 14–18. When they are on the upper portion of their transit, they are above the belts 14–18.

As best seen in FIGURE 3, each shoe 13 is of tubular, triangular cross section or configuration, and has a continuous slot 21 along that side or portion 22 facing the belts 14–18. Bearing against the under surface of the side or wall 22, which has the slot 21, is a backing bar 23, having a plurality of bolt holes 24 through which pass carriage bolts 26, which secure the grouser shoes 13 to the belt 14, and in similar fashion, to the other belts 16, 17 and 18.

The carriage bolts 26 have the customary square subhead 31, which mates with the square holes 24, thereby preventing the bolts from turning when the nuts 27 are tightened down. A small, flat plate 28, placed between the belt 14 and the nuts 27, serves in effect as a washer.

In the installation of a bar 13 to the belts 14–18, there is employed, as a construction jig, a back-up rod 33, which substantially fills the interior of the tubular grouser shoe 13. By pressing against the head of the bolts 26, rod 33 maintains the bolts in position until the nuts 27 can be tightened down.

Each grouser shoe 13 is provided with a pair of bails 34 and 36, one on each side of the wheels 12, which project inwardly with respect to the endless belts 14–18 and serve as guides for the wheels 12 as they roll within the endless belts. The bails 34–36 are preferably formed of an integral piece of steel having a connecting bight portion 37, against which the wheels 12 actually bear. This bight portion is welded to the upper side or face 22 of the grouser shoes 13, and thus spans and closes the slot 21, to strengthen the shoes, without derogating from the convenience of installation provided by the slot. The bails 34 and 36 also serve as drive sprockets, being engaged by the toothed periphery of driving wheels 42.

To provide better traction and particularly to prevent side slipping, each grouser shoe 13 has welded at the center thereof a depending V-shaped cleat 41.

The grouser shoes 13 are preferably formed of 12-gauge steel alloy, known as Cor-Len, which provides a very strong shoe with a minimum of weight.

By employing the continuous slot 21 in the grouser shoes 13, there is eliminated all securing welding and also the necessity for drilling any holes in the upper surface of the grouser bar, which would create fatigue points at which weaknesses and fractures might occur. The provision of the continuous slot 21 also makes the grouser bar 13 adaptable to different sizes of vehicles and different spacings of the belts 14–18. This is because the backing plates 23 can be slid back and forth within the bar 13 until the bolt openings 24 line up with whatever position the belts 14-18 happen to reside at.

A traction vehicle 11 provided with grouser bars 13 of the present invention has been found to give markedly better performance than when provided with grouser shoes of other designs. The present grousers excel in climbing ability, side hilling, and travelling in powder snow. They are also excellent during summer and spring in travelling over brush, rock and sand.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:
1. An endless track vehicle comprising:
   a plurality of longitudinally aligned wheels,
   a pair of longitudinally oriented endless flexible belts disposed one on each side of said wheels and
   a plurality of transverse grouser shoes secured to said belts adjacent the outer surface of said belts, characterized by:
   each said shoe being tubular in configuration and having a slot along that portion thereof facing said belts,
   a backing bar within said shoe closing said slot and having square bolt-receiving holes therein,
   carriage bolts having shanks mating with said backing bar holes, and passing through said backing bar, slot, and belt to secure said shoe to the belt,
   a bale having a bight portion and a pair of integral inwardly projecting portions on each end thereof serving as guides for said wheels within said belts, said bight portion being fixedly secured to said shoe across said slot and the ends of said bale engaging said shoe adjacent said belt, thereby to strengthen said shoe by spanning and closing said slot,
   said belts entirely being disposed laterally beyond the respective ends of said bale, thereby providing access for engagement of the ends of said bale with said shoe.

References Cited
UNITED STATES PATENTS

| | | | |
|---|---|---|---|
| 1,536,604 | 5/1925 | Bentson | 305—54 |
| 2,564,377 | 8/1951 | Sigurjonsson | 305—54 X |
| 2,707,685 | 5/1955 | Grenier | 305—35 |
| 2,749,189 | 6/1956 | France | 305—35 |
| 3,165,364 | 1/1965 | Hardman | 305—35 X |

RICHARD J. JOHNSON, *Primary Examiner.*